United States Patent [19]
Batter, Jr.

[11] 3,724,935
[45] Apr. 3, 1973

[54] METHOD AND APPARATUS FOR EDITING MOTION PICTURE FILM

[75] Inventor: John F. Batter, Jr., Lincoln, Mass.
[73] Assignee: Polaroid Corporation, Cambridge, Mass.
[22] Filed: July 17, 1970
[21] Appl. No.: 55,735

[52] U.S. Cl..................352/38, 352/78 C, 352/180
[51] Int. Cl.............................................G03b 21/48
[58] Field of Search.............352/38, 17, 78 C, 180

[56] References Cited

UNITED STATES PATENTS

| | | | |
|---|---|---|---|
| 2,905,048 | 9/1959 | Miller | 352/38 |
| 3,580,667 | 5/1971 | Moore | 352/24 |
| 3,288,550 | 11/1966 | Saraber | 352/180 |
| 3,301,628 | 1/1967 | Hellmund | 352/92 X |
| 3,389,953 | 6/1968 | Gerry | 352/78 |
| 3,539,248 | 11/1970 | Lancor | 352/17 X |
| 3,492,927 | 2/1970 | Thiele et al. | 352/78 C X |

Primary Examiner—Louis R. Prince
Assistant Examiner—Frederick Shoon
Attorney—Brown and Mikulka, William D. Roberson and Robert L. Berger

[57] ABSTRACT

A motion picture film editing method and apparatus by which film portions to be deleted during projection are indicated by signals recorded on a fixed record track attached to a cassette housing the film. A scanning transducing head is provided in the projector and advanced in synchronism with the film advance mechanism to sense the recorded signals and control film advance speed in a manner such that the portions of the film to be deleted are fed at high speeds past the projector light path whereas those to be viewed are fed at normal speeds. Also, the light path is blocked during passage of the deleted film portions therethrough.

11 Claims, 6 Drawing Figures

PATENTED APR 3 1973

INVENTOR
JOHN F. BATTER, JR.

BY Brown + Mikulka
and Robert L. Berger
ATTORNEYS

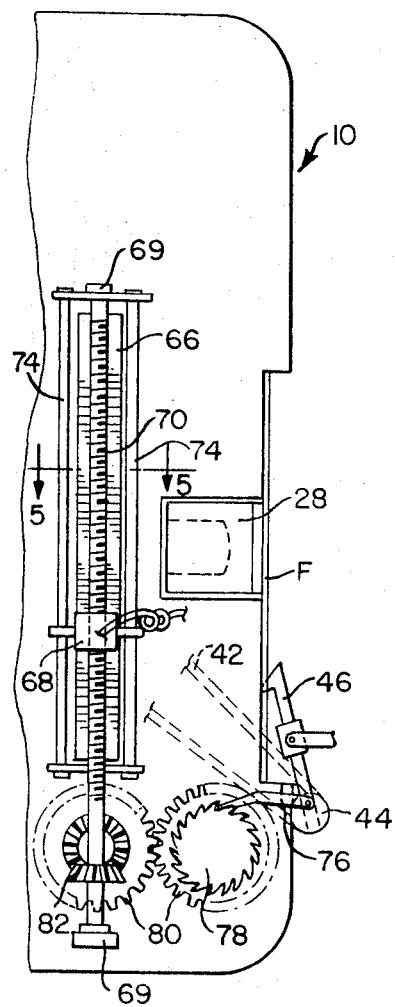
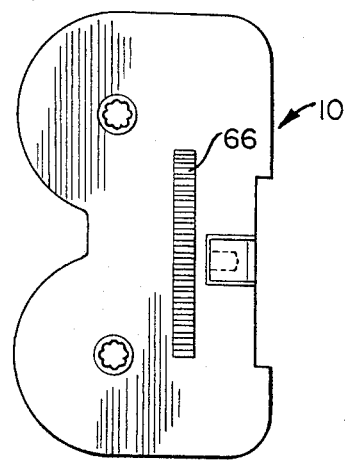
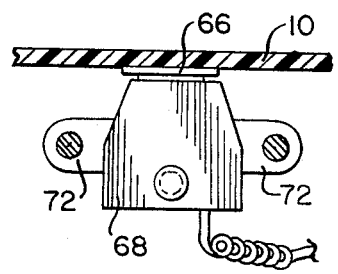
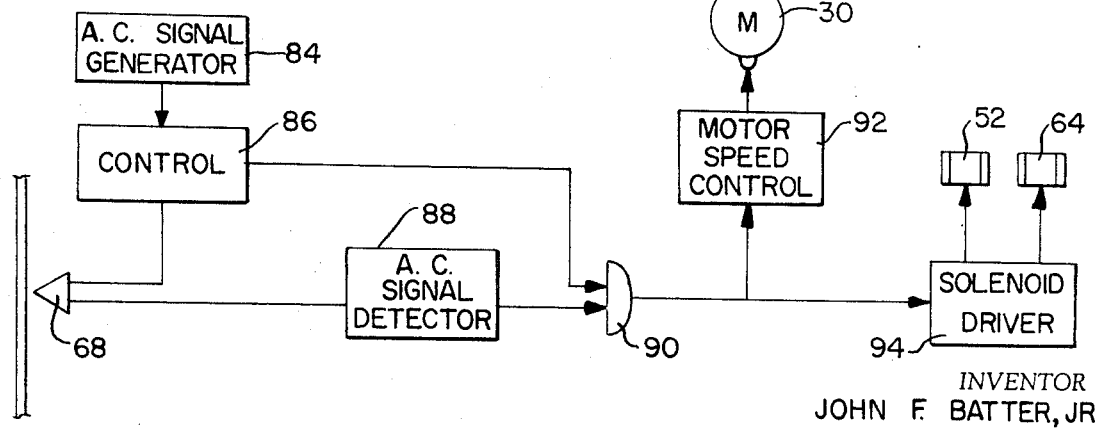

METHOD AND APPARATUS FOR EDITING MOTION PICTURE FILM

CROSS REFERENCE TO RELATED APPLICATIONS

Application by Edwin H. Land entitled "Method and Apparatus for Editing Motion Picture Film" Ser. No. 55,736 executed on July 14, 1970 and filed concurrently herewith.

BACKGROUND OF THE INVENTION

This invention relates to motion picture film editing and more particularly, it concerns a novel method and apparatus by which such film may be edited and projected without physical alteration of the film while at the same time maintaining reasonable continuity in the projected image to be viewed.

In the aforementioned co-pending application, Ser. No. 55,736, (Case 4075) there is disclosed a method and apparatus for editing motion picture films which involves basically the recording of signals on a track having a storage capacity corresponding in magnitude to the length of the film to be edited, the signals delineating undesired portions of the film to be deleted during projection from other portions of the film to be viewed and employing such signals to effect an increase in film advance speed during the passage of deleted film portions through the optical axis of the projector simultaneously with blockage of the projection light during such passage. In the illustrated embodiments, the film itself is provided with a linear strip portion capable of receiving optical or electromagnetic signals and the projection apparatus provided with transducing means for recording and sensing signals on the track. The editing procedure is effected by imposing an AC signal, for example, on a film carried magnetic track to corresponding to those portions of the film to be deleted while leaving unrecorded other portions of the track corresponding to those portions of the film to be viewed. During projection, the head senses or detects the recorded signals and through appropriate control circuitry, brings about an increase in film advance speed which is maintained so long as those portions of the film to be edited are passing through the optical axis of the projector. At the end of such portions to be deleted, normal projection rates are restored.

SUMMARY OF THE PRESENT INVENTION

In accordance with the present invention, the basic motion picture film editing principles disclosed in the aforementioned co-pending application are utilized but in a manner such that conventional motion picture film, devoid of any provision for a recording track thereon, may be edited effectively without alteration, manipulation or physical contact with the film itself in any way. Specifically, a scanning transducing head driven in synchronism with the film advance mechanism is positioned with respect to a fixed recording track in such a manner that signals, recorded on the track to delineate undesired portions of the film to be deleted from view during projection, are used to achieve the desired change of film advance speed. The present invention is particularly suitable for use with motion picture film cassettes of the type insertable directly into projection machinery inasmuch as a contemplated embodiment involves the mounting of the fixed recording track on an exterior surface of the cassette structure.

Among the objects of the present invention are: the provision of an improved method and apparatus for editing motion picture film; the provision of such a method and apparatus which is readily adaptable to existing forms of motion picture film cassettes; and the provision of such a motion picture editing method and apparatus in which any modification, alteration or contact with the film itself is totally avoided.

Other objects and further scope of applicability of the present invention will become apparent from the detailed description to follow taken in conjunction with the accompanying drawings

BRIEF DESCRIPTION OF THE DRAWINGS

FIG. 3 is a fragmentary side elevation in partial cross-section showing the opposite side of the film cassette illustrated in FIG. 1 in relation to other operating components of the projection apparatus of this invention;

FIG. 4 is a side elevation illustrating an exterior surface of the motion picture film cassette employed with the present invention;

FIG. 5 is a fragmentary cross-section taken on line 5—5 of FIG. 3; and

FIG. 6 is a block diagram of a control circuit for the practice of the present invention.

DETAILED DESCRIPTION OF THE PREFERRED EMBODIMENT

Figure 1:
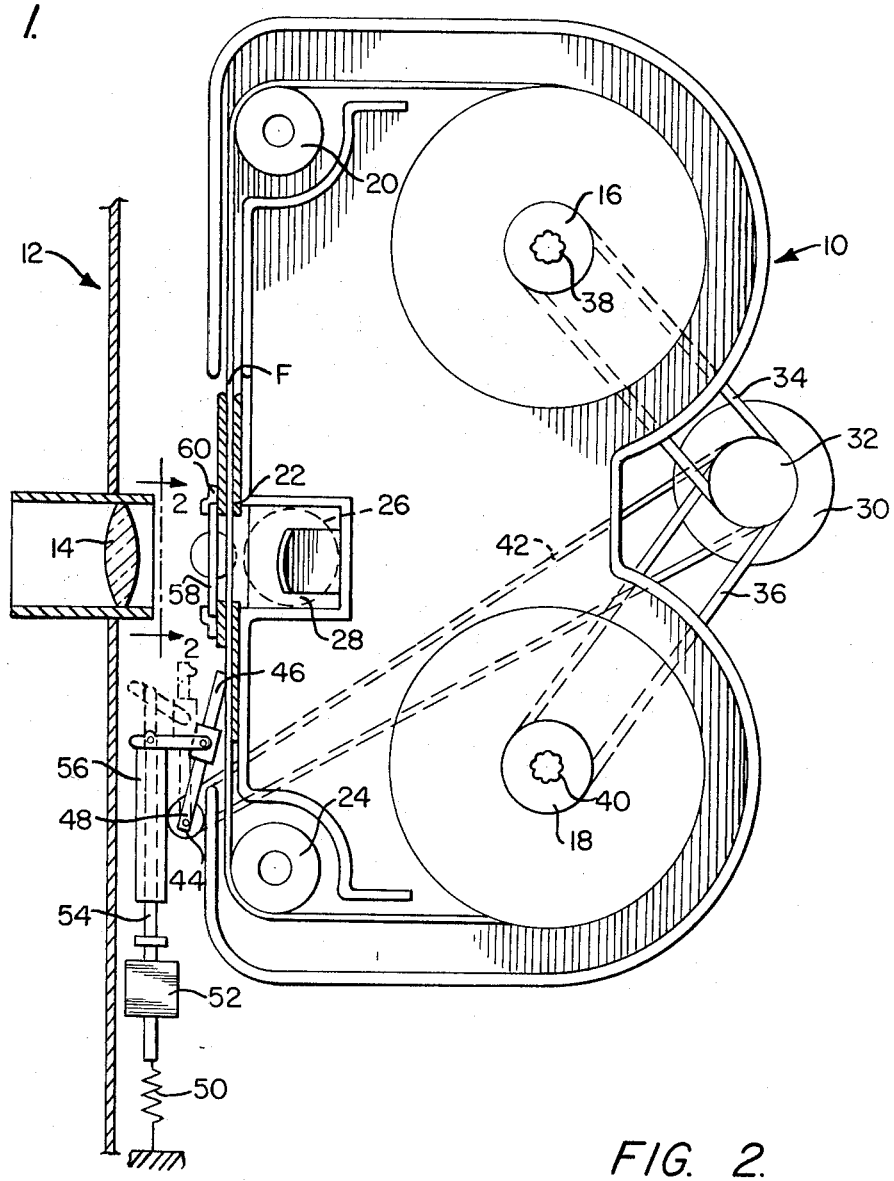
FIG. 1 is a fragmentary side elevation in partial cross-section depicting a motion film cassette in relation to the components of a projection apparatus incorporating means for the practice of the present invention.

Although the present invention is adaptable to diverse general types of projection apparatus, reference is made to the accompanying drawings for exemplary illustrations of embodiments of apparatus suited for the practice of the invention. As shown in FIG. 1 of the drawings, a cassette generally designated by the reference numeral 10 is operably positioned in a projector 12 having a projection lens 14. The cassette 10 includes supply and take-up spools 16 and 18 respectively, on which film F is carried for movement about roller 20, past a film gate 22, aligned with the optical axis of the projector as defined by the axis of the lens 14, and around a snubbing roller 24. Light for projection is supplied by a lamp 26 positioned laterally of a triangular reflecting prism 28 to effect projection of the film image through the lens 14 to a screen or other image receiving means (not shown).

Although many of the components of the projector 12 have been omitted from the drawing in the interest of clarity, it will be noted that drive means for advancing the film F between the respective supply and take-up spools 16 and 18 in the disclosed embodiment includes a variable speed electric motor 30 having a multi-belt drive pulley 32 operably connected by belts 34 and 36 to splined drive shafts 38 and 40 engaged respectively with the spools 16 and 18. Although not shown in the drawings, it will be appreciated by those skilled in the art that the coupling of the drive including the belt 36 to the take-up spool 18 may include conventional slip clutch and brake means. For example, the belt 34 as depicted in FIG. 1 would not, in practice, positively drive the spool 16 during advancement of the film to the take-up spool 18 inasmuch as the two spools must be driven at the same tangential speed requiring a variance in angular velocity as a result of the changing diameter of the film wound thereon. The belt 34, therefore will be effective only during rewinding of the film, the shafts 38 and 40 being equipped with appropriate clutch means (not shown) to this end.

A third belt 42 connects the motor 30 with an eccentric crank 44 forming part of an intermittent film drive means carried by the projector 12 and including a reciprocable claw 46 connected by a pin 48 to the eccentric 44. In accordance with conventional practice, the claw 46 operates to advance that portion of the film F extending between the roller 20 and the snubbing roller 24 incrementally, frame by frame, past the gate 22. Though ordinarily the claw 46 is maintained in a single operable relationship with respect to the projector mounted cartridge, in the embodiment shown, the claw 46 is retractable against the bias of a tension spring 50 by a solenoid 52 which functions, when energized, to advance a link 54 slidably in a tubular guide 56 between the positions depicted by solid and phantom lines in FIG. 1. Thus, in the solid line position maintained by the spring 50, the claw 46 is operative to advance the film F intermittently in the conventional manner. When the solenoid 52 is energized however, in a manner to be described in more detail below, the claw 46 is retracted to the position illustrated in phantom lines so as to be out of engagement with the film F.

Figure 2:
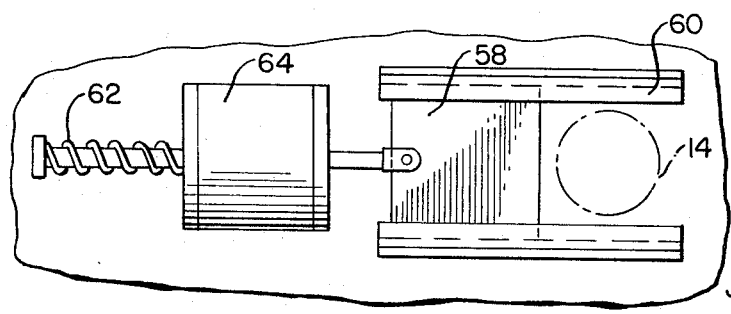
FIG. 2 is an enlarged fragmentary cross-section taken on line 2—2 of FIG. 1.

In accordance with the present invention, the projection equipment is provided with a movable blind 58 for blocking the passage of light through the gate 22 and the lens 14 during editing of film strip portions. In the embodiment illustrated in FIGS. 1 and 2 of the drawings, the blind 58 is carried slidably for reciprocation in guides 60 fixed to the projector 12 and maintained normally in a retracted position clear of the optical axis by a compression spring 62. A solenoid 64 is provided to advance the blind 58 against the bias of the spring 62 over the optical axis of the projector 12 as defined by the lens 14.

In a manner which will become more apparent from the description below, the motor 30 and the solenoids 52 and 64 are controlled in response to signals recorded on a track fixed with respect to the projector 12 and corresponding in magnitude to the length of film to be edited; that is, the film F contained within the cassette 10 in the disclosed embodiment. Inasmuch as the cassette 10 is fixed with respect to the projector once it has been positioned operably therein, and in order that the recorded signals may be correlated directly with the particular film strip to be edited, it is preferred that the track be fixed to the cassette 10 itself. Thus, as shown in FIGS. 3–5 of the drawings, the aforementioned recording track takes the form of a strip 66 carrying magnetic material similar to that used in magnetic sound or information storage tapes and suitably secured in an appropriate manner on an exterior surface of the cassette 10. In this context, it is to be noted that the strip 66 provides a media on which magnetic signals can be recorded in a manner well known to those skilled in the magnetic recording art to provide indicia suitable for the practice of the present invention in the manner more fully described below. Other forms of indicia can be employed, however, such as markings capable of being sensed by photoelectric means, physical alterations in appropriate material capable of being sensed mechanically, and the like. Although the strip 66 may be secured to the cassette surface in various ways, it is preferred that the strip be provided with its own pressure sensitive or other adhesive to facilitate its being mounted on the cassette subsequent to the manufacture of the cassette itself.

With reference to FIGS. 3 and 5 of the drawings it will be noted that a scanning magnetic transducing head 68 is supported within the projector 12 for movement along the track 66 (once the cassette 10 is operably positioned in the projector) by a feed screw 70 rotatably supported within the projector by bearings 69. The body of the head is provided with internal threads (not shown) to engage the screw and to insure relative rotation between the screw 70 and the head 68, the head is provided with a pair of gears 72 engagable over guide rods 74 extending the full length of the track 66 and of the screw 70. In order that the head 68 will be advanced along the screw 70 and thus along the track 66 in synchronism with the advance of the film F by the feed claw 46, means is provided in the projector by which the screw 70 will be rotated and thus the head 68 advanced incrementally once for each operation of the claw 46 or one step for the passage through the gate 22 of each image frame carried by the film F. In the embodiment shown, the means provided to serve this function take the form of a pawl 76 carried on the opposite side of the eccentric 44 from the side on which the claw 46 is connected, and engagable with a stepping ratchet 78 drivably connected to the screw 70 through pinion gears 80 and bevel gearing 82. Because of the substantial gear reduction effected by this mechanism in conjunction with that afforded by the screw 70, it will be appreciated that the head 68 will be stepped along the track through extremely small increments of travel. Thus the length of the track 66, though corresponding to the length of the film F, is substantially shorter than the film.

The head 72 is preferably of the "read-write" type, thereby being operative both to impose or record a signal on the track 66 and to develop an electromagnetic response to a signal previously recorded on the track. It is contemplated that the projector 12 will carry the circuit shown in FIG. 6 which includes, in addition to the head 68, an AC signal generator 84 operable by an appropriate control 86 to reorient the magnetic characteristics of the track 66 over any portion thereof corresponding to a portion of the film F. The signal thus imposed or recorded on the track 66 may also be transduced by the head 68 and fed through an AC signal detector 88, a gate 90, to a motor speed control unit 92 and to a solenoid driver 94. As depicted in FIG. 6, the motor 30 is under the direct control of the speed control unit 92 and also, both solenoids 52 and 64 are energized simultaneously by the driver 94. The control 86 is coupled to the gate 90 to prevent the passage of a signal to the motor speed control and solenoid driver during use of the AC signal generator to place a signal on the track 66.

In the practice of the present invention employing a projector equipped with the components described above, the cassette 10 containing the film strip F to be edited is placed in the projector positioning the track 66 relative to the transducing head 68 as shown in FIGS. 3 and 5 of the drawings. The projector is then operated to view the film strip and ascertain undesired portions thereof which should be deleted during presentation of the remaining portions of the film strip. When such a portion to be deleted passes the axis of the lens 14, the control 86 is operated so that the head 68 will record on the track 66, a signal corresponding to that portion of the film to be deleted. Correspondingly, operation of the control 86 is terminated upon reaching the end of the film portion to be deleted.

After the film F has been edited in the aforementioned manner, it is ready for presentation to a viewer. During such presentation, those portions of the film F to be presented will be fed at normal projection rates of feed by the drive motor 30 through its connection to the eccentric 44 of the intermittent drive claw 46 and to the take-up spool 18. When, however, a signal is read or sensed by the transducing head 68, thus indicating a portion of the film F to be deleted, the signal is passed to the motor speed control 92 in the manner aforementioned to increase the speed of the motor and effect a high rate of film advance speed through the gate 22. Simultaneously with such increase in motor speed and thus rate of film advance or feed, the solenoids 52 and 64 are actuated to retract the intermittent advance claw 46 and block passage of projection light through the lens 14 respectively. The head 68, however, will continue its advance along the screw 70 due to continued operation of the pawl 76 and ratchet 78. At the end of the deleted portion, the absence of a signal on the track 66 will terminate operation of the signal detector 88, thereby effecting a return of the motor speed to that normally used for projection as well as a return of the claw 46 to its operative position by the tension spring 50 and a return of the blind 58 to its retracted position by the compression spring 62. In this manner, the presentation during projection of the film F to a viewer will include only those portions of the film that the editor so desires to present. Although the presentation will be interrupted slightly during the passage of the edited portions through the gate 22, the current state of the art with respect to electric motors and controls therefor, as well as the low inertia of the limited amount of film contained in the cartridge 10 permits that interval to be reduced to such a short duration of time as to be undetectable by the human eye.

Thus it will be appreciated that by this invention there is provided a highly improved method and apparatus for editing motion picture films by which the above mentioned objectives are completely fulfilled. Of particular note, is the facility for editing motion picture film, provided by the present invention, by which no physical modification, alteration or contact with the film itself is required. Also, it will be apparent to those skilled in the art that various modifications and/or adaptations of the disclosed embodiment can be made without departure from the true spirit and scope of the present invention. Accordingly, it is expressly intended that the foregoing description is illustrative only, not limiting, and that the true spirit and scope of the present invention is to be determined by reference to the appended claims.

I claim:

1. The method of editing motion picture film comprising the steps of: recording signals on a track having a storage capacity corresponding in magnitude to the length of the film to be edited, said signals delineating undesired portions of said film to be deleted from other portions thereof to be viewed; advancing said film through a projection axis; advancing a signal sensing device along said track in synchronism with said film advance, said track being fixedly positioned relative to said projection axis at least during said advancement of said film and said signal sensing device; and regulating the rate of film advance in response to said signals between normal projection feed rates during passage of said other portions through said projection axis and relatively high feed rates during passage of said undesired portions through said axis.

2. The method recited in claim 1 wherein said track is fixed to a cassette containing the film.

3. The method recited in claim 1 including the step of blocking the passage of light on said axis during advancement of said film at said relatively high feed rates.

4. Apparatus for editing and projecting motion picture film, said apparatus comprising: means to establish a path of light through which said film is passed for projection; means to establish a record track having a storage capacity corresponding in magnitude to the length of film to be edited; movable means for detecting signals recorded on said track to delineate undesired film portions from desired film portions to be projected; drive means for advancing said film through said light path, said drive means including means to advance said detecting means along said track in synchronism with the advance of said film through said path of light, said track being fixedly positioned relative to said path of light at least during said advancement of said film and said signal detecting means; and means to control said drive means in response to said signal detecting means to advance said desired film portions through said path at normal projection rates of feed and to advance said undesired film portions through said path at a relatively high rate of speed.

5. The apparatus recited in claim 4 including means to block said path of light during passage of said undesired film portions therethrough.

6. The apparatus recited in claim 4 including a cassette containing said film, said record track being mounted on an exterior surface of said cassette.

7. The apparatus recited in claim 6 wherein said record track is a magnetic tape adhesively secured to the exterior of said cassette and wherein said detecting means includes a magnetic transducing head.

8. The method of editing motion picture film comprising the steps of: providing indicia along a track separate from said film and affixed to a cassette containing said film, said indicia delineating certain portions of said film intended not to be viewed during viewing operations associated with said film from other portions thereof intended to be viewed during such operations; progressively advancing said film through a projection axis; effecting relative motion between an indicia sensing device and said track in synchronism with said film advance; and regulating the rate of film advance in response to said indicia sensing device between normal viewing feed rates during passage of said other portions of said film through said projection axis and relatively high feed rates during passage of said certain portions of said film through said axis.

9. The method recited in claim 8 additionally including the step of precluding the passage of light on said axis whenever said film is being advanced therethrough at said relatively high feed rates.

10. Apparatus for projecting motion picture film comprising a cassette in which said film is housed: means for establishing a path of light along a given axis; means for providing indicia along a track separate from said film and affixed to said cassette, said indicia delineating certain portions of said film not to be viewed during viewing operations associated with said film from other portions thereof intended to be viewed during such operations; an indicia sensing device; means for progressively advancing said film through said axis; means for effecting relative motion between said indicia sensing device and said track in synchronism with the advance of said film through said axis; and means for regulating the rate at which said film is advanced through said axis in response to said indicia sensing device between normal viewing feed rates during passage of said other portions of said film through said axis and relatively high feed rates during passage of said certain portions of said film through said axis.

11. The apparatus of claim 10 additionally including means for precluding the passage of light on said axis whenever said film is being advanced therethrough at said relatively high feed rates.

* * * * *